United States Patent
McCann et al.

(10) Patent No.: US 6,224,297 B1
(45) Date of Patent: May 1, 2001

(54) METHOD AND APPARATUS FOR USE IN CONVEYING MATERIAL

(75) Inventors: Gerald McCann, Los Angeles, CA (US); Richard Macartan Humphreys, Mount Merrion (IE)

(73) Assignee: TMO Enterprises Limited, County Dublin (IE)

( * ) Notice: Subject to any disclaimer, the term of this patent is extended or adjusted under 35 U.S.C. 154(b) by 0 days.

(21) Appl. No.: 09/078,553

(22) Filed: May 14, 1998

(51) Int. Cl.[7] .................................................. B65G 53/66
(52) U.S. Cl. .............................. 406/50; 406/56; 406/60; 406/61; 406/105; 406/130; 406/132; 406/148
(58) Field of Search ................... 406/50, 56, 60, 406/61, 105, 130, 132, 148

(56) References Cited

U.S. PATENT DOCUMENTS

| | | | |
|---|---|---|---|
| 3,651,656 | * 3/1972 | Esser et al. | 62/137 |
| 3,693,842 | * 9/1972 | Cozzarin et al. | 406/55 |
| 3,726,102 | * 4/1973 | Parks | 62/70 |
| 3,730,500 | * 5/1973 | Richards | 261/140.1 |
| 4,084,725 | * 4/1978 | Buchser | 221/75 |
| 4,228,923 | * 10/1980 | Barnard | 222/52 |
| 4,252,002 | * 2/1981 | Mullins, Jr. | 62/344 |
| 4,481,786 | * 11/1984 | Bashark | 62/160 |
| 4,498,607 | * 2/1985 | Jaschinski | 222/146.6 |
| 4,604,875 | * 8/1986 | Keller | 62/354 |
| 4,674,656 | * 6/1987 | Wiley et al. | 222/129.1 |
| 4,679,715 | * 7/1987 | Hovinga | 222/517 |
| 4,732,301 | * 3/1988 | Tobias et al. | 222/203 |
| 4,771,609 | * 9/1988 | Funabashi | 62/137 |
| 4,787,539 | * 11/1988 | Uchida et al. | 222/639 |
| 4,846,381 | * 7/1989 | Kito et al. | 222/638 |
| 5,056,688 | * 10/1991 | Goetz et al. | 222/146.6 |
| 5,230,448 | * 7/1993 | Strohmeyer et al. | 222/643 |
| 5,293,757 | * 3/1994 | Nishio | 62/344 |
| 5,549,219 | * 8/1996 | Lancaster | 222/1 |
| 5,560,221 | * 10/1996 | Snelling et al. | 62/344 |
| 5,910,164 | * 6/1999 | Snelling et al. | 62/344 |

OTHER PUBLICATIONS

US 5,267,672; Dec. 1993; Jacobsen et al.*
US 4,921,149; May 1990; Miller et al.*
US 5,165,255; Nov. 1992; Alvarez et al.*
US 5,029,737; Jul. 1991; Yamamoto.*

* cited by examiner

Primary Examiner—Christopher P. Ellis
Assistant Examiner—Joe Dillon, Jr.
(74) Attorney, Agent, or Firm—Sughrue, Mion, Zinn, Macpeak & Seas, PLLC

(57) ABSTRACT

A dispensing apparatus for dispensing a particulate material having an upstream source of particulate material, a delivery device disposed downstream of the upstream source of particulate material and communicable with the source for delivering the particulate material from the source to a discharge conduit, conveying device communicable with the discharge conduit for conveying the particulate material through the discharge conduit, the delivery device and the conveying device being cooperable to form an incremental batch of dischargeable particulate material downstream of the delivery device.

24 Claims, 6 Drawing Sheets

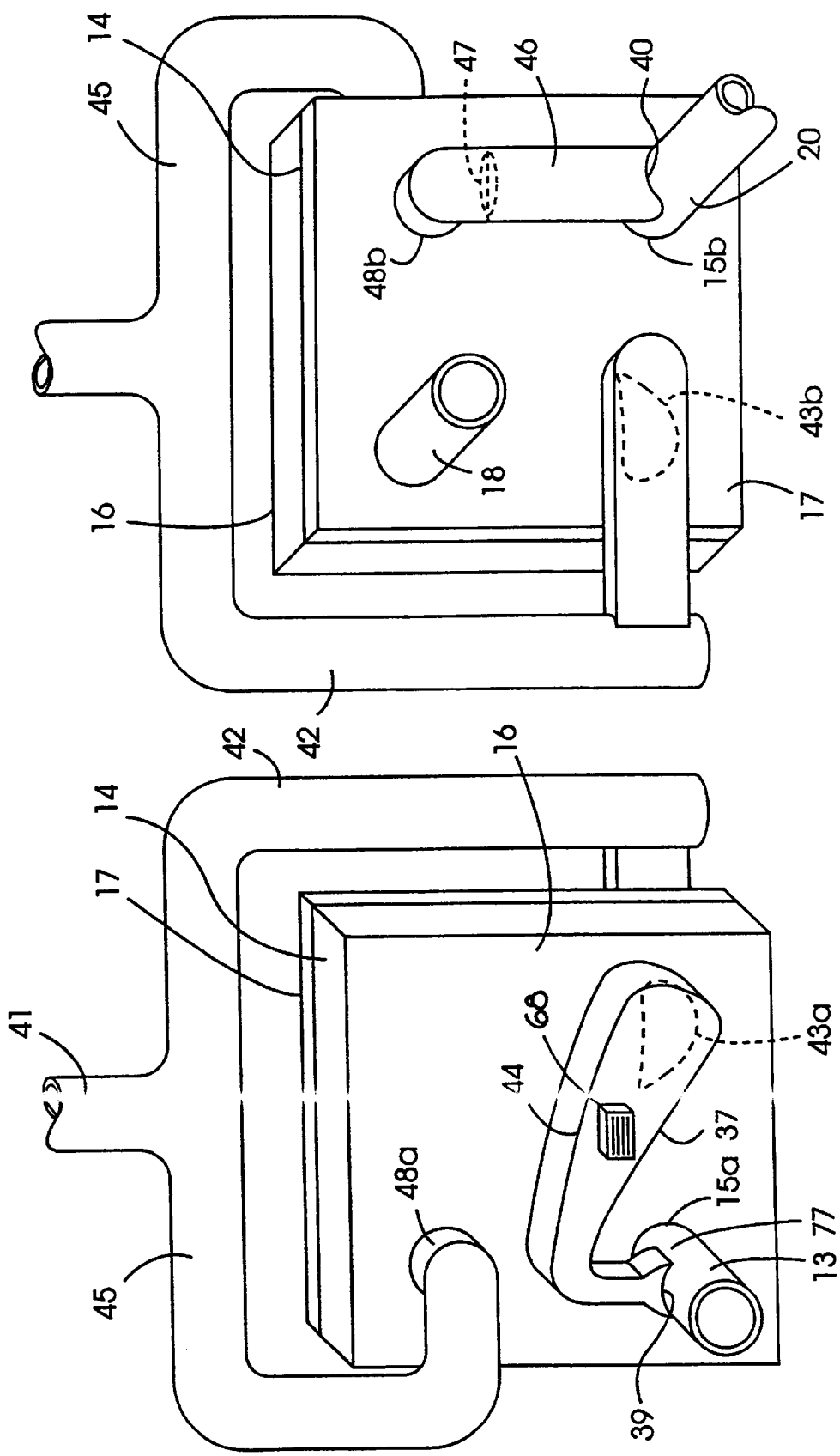

METHOD AND APPARATUS FOR USE IN CONVEYING MATERIAL

FIELD OF THE INVENTION

The present invention relates to a dispensing apparatus, and in particular, to a dispensing apparatus for dispensing a batch of particulate material. Further, the invention relates to a dispensing apparatus for dispensing particulate ice typically formed in an ice-maker communicable with the dispensing apparatus. The term particulate ice as used throughout this specification and claims is intended to mean any type, size or shape of ice lump, for example, an ice lump of the type typically referred to as an ice cube commonly used in beverages. Such ice cubes may be of any shape besides being cubic and may be of regular or irregular shape, cylindrical shape, prismatic shape, spiral shape, and the like, and, indeed, such ice lumps may be hollow. The term particulate ice is also intended to include a flake or particle of ice, such as, for example, flake ice, commonly used for cooling purposes. The term particulate ice is also intended to include crushed ice while the term can also include an ice cube made from compressed flake ice. The invention also relates to a delivery means for delivering a particulate material, and in particular, though not limited to a delivery auger for delivering particulate ice either continuously or in batches. Further, the invention relates to a storage hopper for storing a particulate material before dispensing the material.

BACKGROUND OF THE INVENTION

The physical and flow characteristics of particulate materials, such as ice, results in problems with these storage and dispensing of the particulate material. In known dispensing apparatus, conveying media such as fluids and in particular air can be used to convey ice in batches in a discharge conduit from the dispensing apparatus to a desired location which can be remote from the dispensing apparatus. The batches of ice can be formed by accumulating ice under gravity. However, the use of gravity to effect accumulation of ice and the like requires the use of downwardly or vertically oriented conduits and the like. The use of gravity alone to effect the movement of the particulate material can be uncontrollable and hence unreliable and require excessive height for the gravity drop hereinbefore described.

Particulate materials such as ice also have a tendency to fuse or form larger aggregates or particles when stored in storage hoppers. Large particles or aggregates of ice, when formed, can be difficult or impossible to dispense or can cause blockages in storage hoppers either in the hopper proper or in dispensing pipes extending from the storage hopper through which the ice is discharged—large aggregates or large particulates of ice being unable to pass through the dispensing pipe.

Moreover, storage hoppers can in fact accelerate fusion due to the particulate material being compressed during storage in the storage hopper. In addition, fused or compressed ice in a storage hopper can result in "bridging" where the fused ice can cause the ice to form an ice bridge over a discharge opening communicating with the dispensing pipe and ice therefore fails to discharge from the storage hopper.

Ice and other particulate material dispensing apparatus of the prior art can employ delivery means in the form of a delivery auger for delivering the particulate material from the dispensing apparatus. Generally, the delivery auger conveys ice and the like into the dispensing pipe. However, it is known for particulate materials to either become jammed between the delivery auger and the dispensing pipe or alternatively for the particulate material to be damaged by a rotating delivery auger if trapped between eh dispensing pipe and the delivery auger.

OBJECTS OF THE INVENTION

An object of the invention is to overcome the disadvantages of the dispensing apparatus of the prior art. In particular, an object of the invention is to provide a dispensing apparatus for conveying a particulate material.

A further object of the invention is to provide a dispensing apparatus for particulate materials having improved dispensing characteristics.

A still further object of the invention is to provide a dispensing apparatus having improved batch dispensing characteristics and in particular a large batch dispensing capacity.

A further object of the invention is to provide a delivery means having improved particulate material dispensing characteristics.

A still further object of the invention is to provide a storage hopper for presenting or inhibiting fusion the formation of larger aggregates from particulate materials when stored.

Yet a further object of the invention is to provide a method for conveying particulate material which overcomes the problems of the prior art.

SUMMARY OF THE INVENTION

According to the invention there is provided a dispensing apparatus for dispensing a particulate material comprising an upstream source of particulate material, a delivery means disposed downstream of the upstream source of particulate material and communicable with the source for delivering the particulate material from the source to a downstream discharge conduit, conveying means communicable with the discharge conduit for conveying the particulate material through the discharge conduit, the delivery means and the conveying means being cooperable to form an incremental batch of dischargeable particulate material in the discharge conduit.

Preferably, the source of particulate material comprises a storage hopper for the particulate material having a base and four side walls upstanding from the base, the base and the side walls defining a reservoir for particulate material, and an agitator mounted in the reservoir for disrupting aggregation of the particulate material.

Suitably, the delivery means for delivering a particulate material from the source comprises a delivery auger mounted in the source for delivering material from the source through a dispensing outlet defined in the source, and an auger extension contiguous with the delivery auger being extendable through the delivery outlet into a dispensing pipe for delivering particulate material from the source.

Advantageously, the dispensing pipe comprises a dispensing pipe inlet portion and a dispensing pipe outlet portion communicable with the discharge conduit for delivering particulate material from the source to the discharge conduit, and the auger extension has an outer diameter greater than the outer diameter of the delivery auger at the dispensing outlet.

Suitably, the delivery means further comprises control means communicable with the dispensing pipe for controlling delivery of conveying means to and particulate material from the source through the dispensing pipe.

The control means can comprises a closeable plate moveable between a first position in which the dispensing pipe is blocked and a second position in which the dispensing pipe is unblocked.

Preferably the dispensing pipe comprises a conveying means inlet downstream of the control means for introducing the conveying means into the dispensing pipe and the discharge conduit to produce a "backflush" function and to convey particulate material through the dispensing pipe and/or the discharge conduit.

Alternatively, the dispensing pipe also comprises a conveying means inlet upstream of the control means for introducing the conveying means into the dispensing pipe during delivery of material from the source to the discharge conduit.

Advantageously, the auger extension is floatable in the dispensing pipe.

Preferably the auger extension is reversibly rotatable in the dispensing pipe to clear the dispensing pipe outlet portion of particulate material.

In a preferred embodiment of the invention the conveying means comprises a pressurised conveying medium.

Suitably, the conveying medium comprises air.

Advantageously the conveying means comprises back pressurising means for causing a pressure accumulation in the discharge conduit to facilitate effective discharge of the incremental batch from the conduit.

Preferably the agitator comprises an elongate shaft, having a longitudinal axis, mounted between at least two of the side walls.

Suitably the shaft comprises secondary agitating means.

Preferably the secondary agitating means comprises spikes and/or T-bars disposed transversely to the longitudinal axis of the shaft.

Preferably the shaft is rotatable up to 360°, preferably between 30° and 120° intermittently at pre-set or random intervals about the longitudinal axis to disrupt aggregation of particulate material.

Suitably the shaft is rotatable during delivery of the particulate material from the source to the discharge conduit.

The invention also extends to a delivery means for delivering a particulate material from an upstream housing defining a reservoir for particulate material to a downstream discharge conduit comprising a delivery auger mounted in the reservoir for delivering material from the reservoir through a dispensing outlet defined in the housing, an auger extension contiguous with the delivery auger being extendable through the dispensing outlet into a dispensing pipe for delivering the particulate material form the reservoir, the auger extension having an outer diameter greater than the outer diameter of the delivery auger at the dispensing outlet.

Preferably, the housing comprises a base having four side walls upstanding therefrom, the dispensing outlet being defined in at least one of the four side walls.

More preferably the auger extension is floatable in the dispensing pipe.

Suitably the auger extension is reversibly rotatable in the dispensing pipe.

The invention also extends to a method for conveying particulate material from a particulate material source to a remote location through a discharge conduit by a conveying medium, the method comprising the steps of delivering the particulate material into the discharge conduit at an upstream end of the conveying conduit, and supplying the conveying medium to the discharge conduit to form an incremental batch of particulate material within the discharge conduit, and applying conveying medium to the incremental batch to discharge the incremental batch from the discharge conduit.

Preferably, the conveying medium comprises a pressurised fluid. More preferably, the pressurised fluid comprises pressurised air.

Suitably, the pressurised fluid is supplied intermettently to the particulate material to deliver the particulate material in mini-batch form into the discharge conduit to form the incremental batch.

Alternatively, the pressurised fluid is supplied continuously to the particulate material to deliver continuously into the discharge conduit to form the incremental batch. Most preferably, the pressurised fluid is then applied at higher pressure to the incremental batch to discharge the incremental batch from the discharge conduit.

Suitably a control means is provided between the discharge conduit and the source for controlling movement of conveying medium.

Advantageously the control means comprises a door means moveable between a blocking and an unblocking position in which an opening is defined in the control means and wherein the method comprises opening the door means to deliver the particulate material into the discharge conduit, leaving the door means open following delivery into the discharge conduit and applying conveying medium in an upstream direction of backflush the opening, closing the door means and maintaining conveying medium flow to deliver the incremental batch.

Preferably the method comprises delivering the particulate material from the source by rotating a delivery auger in a first direction in the source and reversing the direction of rotation of the delivery auger following formation of the incremental batch.

Suitably the direction of rotation of the delivery auger is reversed during backflush.

In one embodiment of the invention the control means comprises a door means moveable between a blocking and an unblocking position in which an opening for particulate material is defined by the door means, in the control means and a first controllable conveying medium inlet upstream of the door means and a second controllable conveying medium inlet downstream of the door means, wherein the method comprises supplying the conveying medium to the first air inlet to assist in delivering the particulate material into the discharge conduit to form an incremental batch, supplying conveying medium to the upstream inlet following delivery of the particulate material into the discharge conduit and blocking the opening and the upstream inlet and maintaining supply of conveying medium to the discharge conduit to convey the incremental batch through the discharge conduit.

Suitably following delivery of the particulate material into the discharge conduit, the conveying medium is applied through the first air inlet upstream of the door before blocking the opening to urge particulate materials past the opening towards the discharge conduit.

Advantageously the method also comprises the step of delivering the particulate material from the source by rotating a delivery auger in a first direction in the source and reversing the direction of rotation of the delivery auger following formation of the incremental batch.

Suitably the pressurised fluid is supplied during loading of the batch at a lower pressure than the pressure used when discharging the incremental batch from the discharge conduit.

Advantageously, the opening for particulate material, the first conveying medium inlet and the second conveying medium inlet are blockable and unblockable by the door means.

An advantage of the dispensing apparatus in accordance with the invention is that the dispensing apparatus is adapted to form a large or incremental batch or particulate material which can be subsequently discharged by the dispensing apparatus without depending totally on a gravity drop. The large batch of particulate material is formed from a plurality of smaller batches discharged from the storage hopper into the discharge conduit. The plurality of smaller batches is conveyed into the discharge conduit by a conveying medium under pressure, typically a fluid such as air, either intermittently or at constant reduced pressure to form a large batch of particulate material in the discharge conduit. The discharge conduit is typically made up of a coiled discharge conduit or pipeline disposed beneath the storage hopper to minimise the size of the apparatus.

Accordingly, the dispensing apparatus may be adapted to function in a number of ways. For example, the particulate material my be dispensed from the storage hopper in a continuous fashion using a conveying medium at reduced pressure to convey the particulate material continuously into a coiled discharge conduit. When the ocilde discharge conduit is fully loaded with particulate material, the conveying medium can be forced at high pressure through the coiled discharge conduit to discharge the particulate material in a large batch format.

Alternatively, the particulate material may be dispensed from the storage hopper into the coiled discharge conduit in small batches by applying the conveying medium intermettently to the dispensing apparatus so that a plurality of small batches of particulate material are dispensed into the discharge conduit to, in combination, from a large or incremental batch of particulate material which is subsequently discharged from the discharge conduit by conveying medium applied at high pressure through the discharge conduit.

Accordingly, the dispensing apparatus in accordance with the invention can be adapted to discharge incremental large batches of particulate material formed incrementally from a plurality of smaller batches of particulate material or alternatively the incremental large batch is formed from a continuous dispensing operation until a large incremental batch of particulate material is formed downstream of a particulate material source.

The dispensing apparatus in accordance with the invention is provided with a delivery means having an auger arrangement for conveying particulate material to the discharge conduit in which the large batch of particulate material is formed. The auger of the auger arrangement is adapted to be reversibly rotatable once the large batch has been formed in the discharge conduit. Moreover, a control means in the form of an ice door is disposed between the auger and the discharge conduit. A reverse rotating action of the auger once the discharge conduit has been loaded with an incremental large batch of the required volume facilitates clearance or removal of particulate material from adjacent the ice door to facilitate closure of the ice door prior to discharge of the large incremental batch. This action can be assisted by the injection of conveying medium upstream of the ice door. Accordingly, blockages and obstruction of the ice door are eliminated. Following closure of the ice door, conveying medium is then forced through the discharge conduit downstream of the ice door to effect discharge of the large batch of particulate material.

The dispensing apparatus in accordance with the invention can also be adapted to receive conveying medium upstream of the ice door during loading of the particulate material by the auger into the discharge conduit. Application of conveying medium upstream of the ice door also facilitates clearance and removal of potentially blocking particulate materials from adjacent the ice door to urge the particulate materials towards the discharge conduit for the formation of the large batch of particulate material for subsequent discharge.

In addition, the dispensing apparatus of the invention may be subsequently "backflushed" through the application of conveying medium downstream of the ice door to effect clearance of particulate material adjacent the ice door and to urge the particulate material, firstly, towards the discharge conduit for the formation of the large incremental batch for subsequent discharge and, secondly, upstream to return any obstructive particulate material in the region of the ice door towards the particulate material source.

Backflushing can be enhanced and assisted by a reverse action of the auger extension in the delivery pipe whilst backflushing to effect clearance of the region adjacent the ice door.

The particulate material to be dispensed by the dispensing apparatus of the invention is delivered by the delivery auger from a reservoir, into the discharge conduit via a dispensing pipe and the ice door described above. In a preferred auger arrangement in accordance with the invention, the auger is provided with a reduced outer diameter at the entrance to the dispensing pipe and an increased outer diameter within the dispensing pipe. The reduced outer diameter at the entrance to the dispensing pipe prevents jamming by and damage to particulate material located adjacent the entrance to the dispensing pipe and facilitates efficient entry of particulate material into the dispensing pipe. The increased outer diameter of the auger withing the dispensing pipe facilitates effective conveying of particulate material within the dispensing pipe to the discharge conduit and also effective clearance of particulate material form within the dispensing pipe during a reverse operation of the auger.

The storage hopper in accordance with the invention is provided with at least one agitator. The provision of an agitator within the storage hopper which can be operated intermittently prevents or inhibits the formation of aggregates or the fusion or particulate material within the storage hopper. The agitator applies shear forces to the particulate materials within the storage hopper to ensure the particulate materials are maintained in a free flowing from for efficient and effective delivery by the delivery auger into the dispensing pipe and the discharge conduit.

The ice door disposed between the dispensing pipe and the discharge conduit of the dispensing apparatus of the invention facilitates effective and selective blocking and unblocking of the dispensing pipe and effective and selective application of conveying medium to the dispensing pipe and discharge conduit so that, firstly, particulate material can be dispensed to form large or incremental batches of dispensed material within the discharge conduit, secondly, the dispensing pipe and the ice door may be cleared of blockages and thirdly, the incremental batch of particulate material formed within the discharge conduit can be quickly and effectively evacuated when required.

The operation of the ice door, the agitator and the delivery auger can be controlled through the use of a micro processor in communication with the ice door, the agitator, the delivery auger and the conveying medium source.

The dispensing apparatus, the storage hopper containing the agitator and the delivery auger and the ice door can therefore be operated automatically under the control of a micro processor to result in the highly efficient storage and dispensing of particulate materials from the dispensing apparatus in accordance with the invention.

The dispensing apparatus, the storage hopper and the delivery means in accordance with the invention are particularly adapted for the dispensing of particulate ice material as hereinbefore defined. However, it will be appreciated by those skilled in the art that the dispensing apparatus, the delivery means and the storage hopper are suitable for use with many particulate materials requiring dispensing and storage.

A particularly advantageous feature of the present invention is that in one embodiment of the invention, the requirement for a vertical drop in the apparatus to effect accumulation of particulate ice within a discharge conduit is completely eliminated thereby minimising the height of the apparatus in accordance with the invention.

In such an embodiment the discharge conduit of the apparatus in accordance with the invention can be made up of a substantially horizontally disposed discharge conduit having no vertical drops. If required, the portion of the discharge conduit which is being used to accumulate the incremental batch may be inclined upwards or downwards. Moreover, the remainder of the discharge conduit can be shaped to be provided with or without corners in the discharge conduit as required again to direct materials within the discharge conduit to a desired location.

A storage hopper is also provided for particulate material comprising a housing, the housing defining a reservoir for particulate material, and an agitator mounted in the reservoir for disrupting aggregation of the particulate material.

Suitably the agitator comprises an elongate rotatable shaft, having a longitudinal axis, mounted between at least two of the side walls of the storage hopper.

Preferably the elongate shaft comprises secondary agitating means.

More preferably the secondary agitating means comprises spikes and/or T-bars mounted on the shaft.

Advantageously the elongate shaft is rotatable up to 360°, preferably between 30° and 120° about its longitudinal axis.

The invention will be more clearly understood from the following description of some preferred embodiments thereof, which are given by way of example only, with reference to the accompanying drawings:

BRIEF DESCRIPTION OF THE DRAWINGS

FIG. 3 is a perspective view from above an the storage hopper side of the inner face of an alternative manifold-type ice door for use in the dispensing apparatus of the invention;

FIG. 4 is a perspective view from above and the opposite side of the outer face of the manifold-type ice door of FIG. 3;

DETAILED DESCRIPTION OF THE INVENTION

Figure 1:
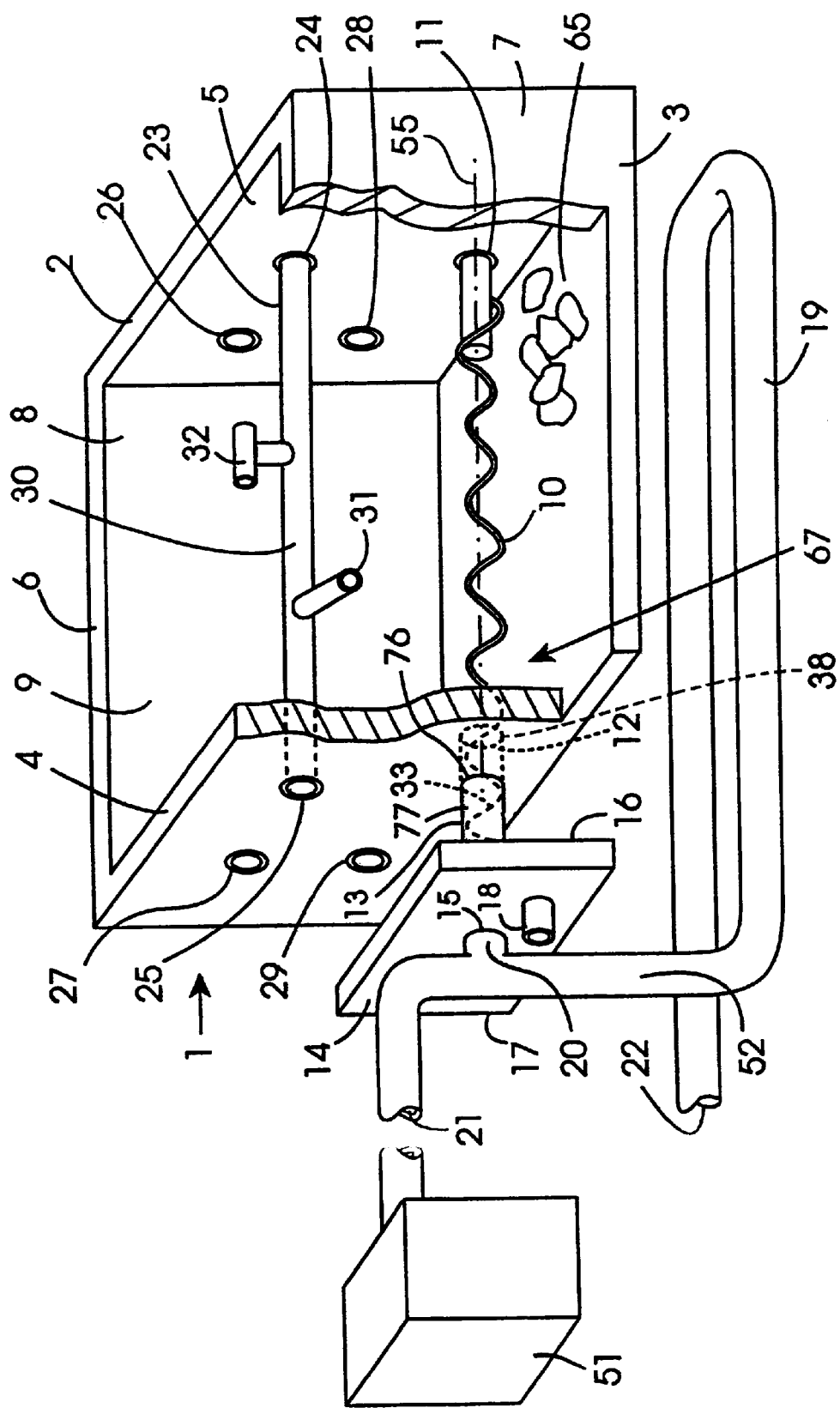
FIG. 1 is an upper perspective view of a dispensing apparatus in accordance with a first embodiment of the invention with the storage hopper having a partially cut away side wall to more clearly illustrate the auger and the agitator in the storage hopper.
Figure 2:
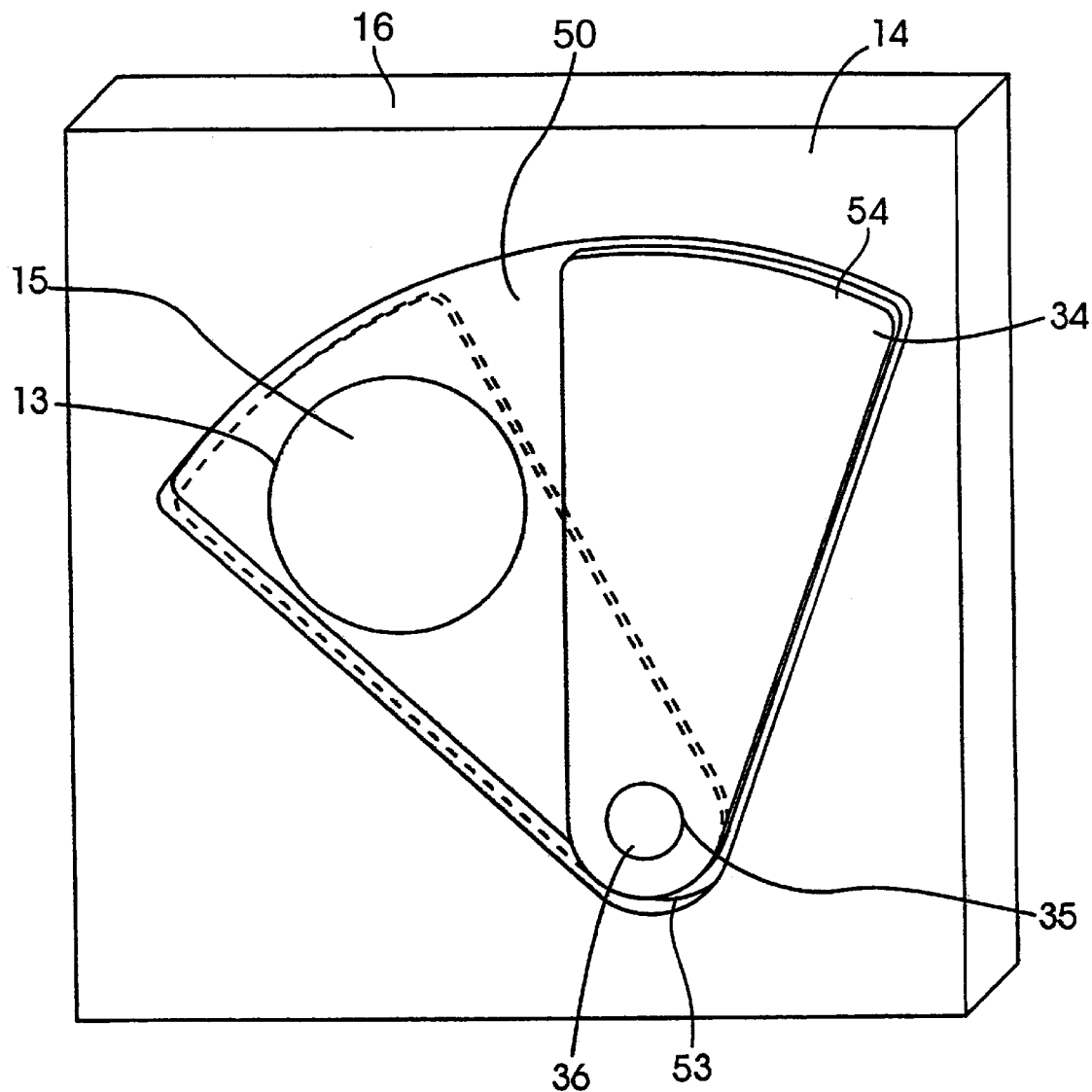
FIG. 2 is an enlarged front elevation of the pivotable plate internal component of an ice door of the dispensing apparatus of FIG. 1 with the pivotable plate shown in the closed position over the dispensing pipe in broken line.
Figure 9:
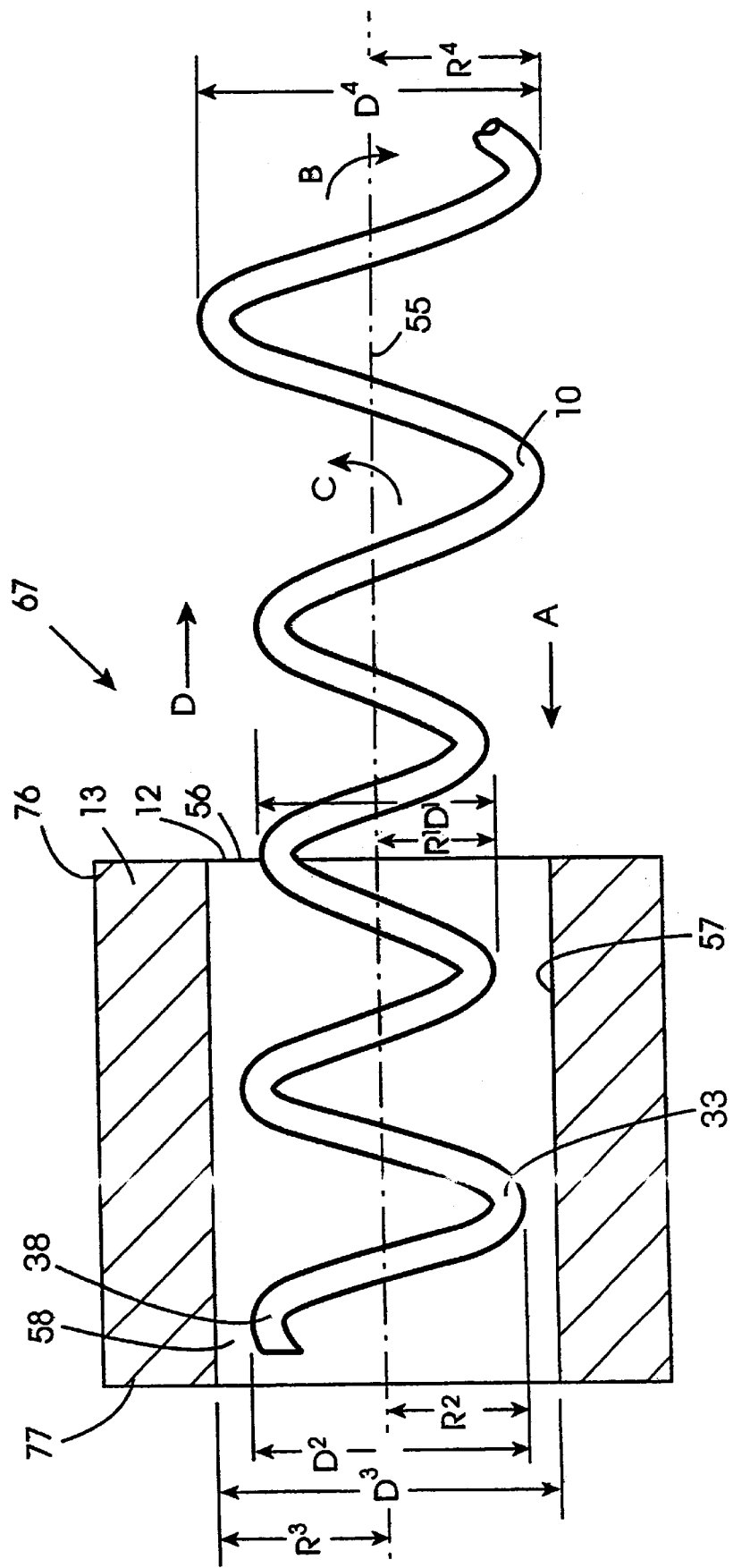
FIG. 9 is an enlarged partially schematic representation of a delivery means made up of an auger arrangement in accordance with the invention.

FIGS. 1, 2 and 9 show a first embodiment of a dispensing apparatus 1 and delivery means made up of a delivery auger arrangement 67 in accordance with a first embodiment of the invention. The dispensing apparatus 1 is for conveying particulate material, for example, lumps of ice which are normally referred to as ice cubes for cooling beverages or the like. The dispensing apparatus 1 is adapted to convey the particulate materials in large incremental batches from a central source such as an ice maker to a location remote from the central source.

As shown in FIGS. 1 and 2, the dispensing apparatus 1 is provided with a storage hopper 2 for storing ice cubes or the like. The storage hopper 2 is typically formed of sheet metal material and comprises a base 3 having four side walls namely a front wall 4, a rear wall 5, a first side wall 6 and a second side wall 7 upstanding therefrom. Alternatively, the storage hopper 2 can be formed from a plastics material. The front and rear walls 4, 5 and the first and second walls 6, 7 in combination define an open mouth 8 at their free ends. The storage hopper open mouth 8 facilitates access to an internal reservoir 9 defined by the base 3, the front and rear walls 4, 5 and the first and second side walls 6, 7.

Internally, the storage hopper 2 is provided with an elongate delivery auger 10 having a longitudinal axis indicated by the reference number 55 which extends longitudinally between the front and rear walls 4, 5 adjacent to but spaced apart from the base 3. The delivery auger 10 is rotatable along the longitudinal axis 55 in a bearing 11 mounted in the rear wall 5 of the storage hopper 2. The delivery auger 10 is driven by an electrically powered motor mounted externally of the storage hopper 2.

The electrically powered motor is provided with an overload protection function whereby the motor cuts out should the delivery auger 10 becomes jammed e.g. by fused ice or the like during operation. The overload protection function serves to prevent damage to the motor and/or the delivery auger 10 in use.

The base 3 of the storage hopper 2 can be sloped or inclined to direct particulate material within the storage hopper 2 towards the delivery auger 10.

The delivery auger 10 has an auger extension 33 contiguous with the auger 10 at its fee end 38 remote from the bearing 11.

The front wall 4 of the storage hopper 2 is provided with a dispensing outlet 12 through which the delivery auger 10 extends into a dispensing pipe 13 having a dispensing pipe inlet portion 76 adjacent the dispensing outlet 12 and a dispensing pipe outlet portion 77 at its other end for conveying or delivering particulate material from the reservoir 9 into the dispensing pipe 13. The auger extension 33 "floates" in the dispensing pipe 13.

Internally, the reservoir 9 of the storage hopper 2 is provided with an agitator 23 for preventing or inhibiting fusion and aggregation of particulate material especially ice cubes within the reservoir or for breaking down aggregates by applying shear forces and the like to particulate materials in the reservoir 9. The agitator 23 is made up of an elongate agitator shaft 30 mounted between the front wall 4 and the rear wall 5 of the storage hopper 2. The elongate agitator shaft 30 is rotatable either intermittently or continuously about its longitudinal axis in agitator shaft bearings 24, 25 disposed in the rear wall 5 and the front wall 4 respectively of the storage hopper 2, while the longitudinal axis of the agitator shaft 30 is disposed parallel to the longitudinal axis 55 of by the delivery auger 10.

The agitator 23 is rotatable in a staggered rotational movement about its longitudinal axis so that rotation of the agitator 23 about its longitudinal axis is in staggered intervals. Accordingly, movement of the agitator 23 about its longitudinal axis is followed by a pause. The agitator shaft 30 can therefore rotate at up to 360° preferably 30° to 120° about its longitudinal axis followed by a pause. It has been found that the staggered rotation of the agitator 23 minimises damage to particulate material in the reservoir 9.

Alternatively, the agitator 23 is controllable to be rotatable in an oscillating or rocking-type motion about its longitudinal axis so that the agitator 23 does not undergo continuous revolutions about its longitudinal axis.

Rotation of the agitator 23 is reversible so that the agitator can oscillate either forwards or backwards or forwards and backwards in the reservoir 9.

The front and rear walls 4, 5 of the storage hopper 2 are provided with additional pairs of agitator shaft bearings 26, 27 and 28, 29 respectively to mount additional agitator shafts 30 in the reservoir 9 or alternatively to relocate a single agitator shaft 30 mounted between the bearings 24, 25 within the reservoir 9 as required.

The agitator shaft 30 is provided with a laterally extending spike 31 disposed at an angle to the longitudinal axis defined by the agitator shaft 30 for effecting agitation of the particulate material within the reservoir 9 thereby preventing aggregation or fusion of ice cubes and the like within the reservoir 9. The agitator shaft 30 is further provided with a laterally extending T-bar disposed at an angle or substantially perpendicular to the longitudinal axis defined by the agitator shaft 30. The T-bar 32, as with the spike 31, serves to impart shear forces to the particulate materials contained within the reservoir 9 upon rotation of the agitator shaft 30 in the bearings 24, 25.

In an alternative embodiment of the invention, the agitator shaft 30 may be provided with a plurality of spikes 31 or a plurality of T-bars 32 or indeed a combination of spikes 31 and T-bars 32 as required.

As described above, the auger extension 33 extends through the dispensing outlet 12 and is inserted in the dispensing pipe 13 located externally of the front wall 4 of the storage hopper 2 and contiguous with the longitudinal axis 55 of the delivery 10.

The dispensing pipe 13 extends from its dispensing pipe inlet portion 76 between the dispensing outlet 12 in the front wall 4 and an ice door 14. The ice door 14 is adapted to control delivery of conveying medium and particulate material such as ice cubes and the like between the dispensing pipe 13 at its dispensing pipe outlet portion 77 and a coiled discharge conduit 19 in communication with the dispensing pipe 13 at the ice door 14 as shall be explained more fully below.

The ice door 14 is box-like in appearance and is made up of an ice door inner plate 16 facing the front wall 4 of the storage hopper 2 and an ice door outer plate 17 mounted against the inner plate 16 in an abutting relationship. Internally, the ice door inner plate 16, is recessed to define a segmental-shaped internal chamber 50 between the inner plate 16 and the outer plate 17.

The dispensing pipe 13 communicates with the coiled discharge conduit 19 through a dispensing pipe port 15 which extends between the ice door inner plate 16 and the ice door outer plate 17 across the chamber 50. The dispensing pipe port 15 communicates at the ice door outer plate 17 with a secondary dispensing pipe 20 which in turn is in communication with a downwardly extending portion 52 of the coiled discharge conduit 19 disposed substantially perpendicular to the longitudinal axis 55 of the delivery auger 10.

Internally, the ice door 14 is provided with a pivotable plate 34 mounted in the internal chamber 50 between the inner plate 16 and the outer plate 17 on a pivot shaft 35 off-set from and disposed beneath the dispensing pope port 15 in the apex of the segmental chamber 50. The pivot shaft 35 is mounted between the inner plate 16 and the outer plate 17 in pivot shaft mounting 36. The pivotable plate 34 is also substantially segmental in shape having a narrow end 53 securely mounted on the pivot shaft 35 and a wide end 54 at its free end remote from the pivot shaft 35. The pivotable plate 34 is pivotable in the chamber 50 about the axis of the pivot shaft 35 between a first position as shown in FIG. 2 in which the dispensing pipe port 15 is unobstructed to facilitate passage of conveying medium, ice cubes and the like through the dispensing pipe port 15 from the dispensing pipe 13 and a closed position shown in broken lines in FIG. 2 over the dispensing pipe port 15 in which the dispensing pipe port 15 is obstructed by the pivotable plate 34 and passage of conveying medium and the like through the dispensing pipe port 15 from the dispensing pipe 13 to the downwardly extending portion 52 of the coiled discharge conduit 19 or in the opposite direction is prevented or inhibited as shall be explained more fully below.

The chamber 50 is sealed between the plates 16, 17 so that the chamber 50 is effectively isolated from the atmosphere.

Movement of the pivotable plate 34 between the open and closed positions is effected by an ice door motor 18 mounted on the outer plate 17.

The coiled discharge conduit 19 is provided with an air entry end 21 disposed in the downwardly extending portion 52 of the coiled discharge conduit 19 and located upstream relative to the discharge conduit 19 above the secondary dispensing pipe 20 and a particulate material/air discharge end 22 for conveying large batches of particulate material from the coiled discharge conduit 19 to a desired location. The air entry end 21 is in communication with a pressurised air blower or other pressurised fluid source 51 for receiving air or fluid under pressure to convey particulate material in or effect discharge of large batches of particulate material from the coiled discharge conduit 19 as shall be explained more fully below.

FIG. 9 is an enlarged partially schematic view of a delivery means made up of the delivery auger 10 and auger extension 33 in a delivery auger arrangement 67 in accordance with the invention. The delivery auger 10 is a wire-type delivery auger. However, as will be appreciated by those skilled in the art, the delivery auger 10 may be of an alternative construction e.g. made from a helical rectangular section with or without a central longitudinal bar or tube. The auger extension 33 extends into the dispensing pipe 13 towards the ice door mounting 14 from the reservoir 9 of the storage hopper 2 as previously described. The direction of movement of particulate material from the reservoir 9 into the dispensing pipe 13 is indicated by the arrow A while the direction of rotation of the delivery auger 10 about its longitudinal axis 55 is indicated by the arrow B. As shown in the drawing, the portion of the delivery auger extension 33 located in the reservoir 9 of the storage hopper 2 has a diameter $D^4$ and a radius $R^4$ while the auger extension 33 of the delivery auger 10 within the dispensing pipe 13 has a diameter $D^2$ and a radius $R^2$. The delivery auger 10 has a diameter $D^1$ and a radius $R^1$ adjacent the dispensing outlet 12 while the dispensing pipe 13 has an internal diameter $D^3$ and a radius $R^3$.

The diameter $D^1$ is intended to indicate the diameter of the delivery auger 10 at the dispensing outlet 12 which as shown in FIG. 9 is equal in diameter to the internal diameter $D^3$ of the dispensing pipe 13. As shown in FIG. 9, the diameter $D^1$ of the delivery auger 10 at the dispensing outlet 12 is smaller than the diameter $D^2$ of the auger extension 33. Accordingly, an annular space or radial clearance 56 is defined around the delivery auger 10 between the delivery auger 10 and an internal face 57 of the dispensing pipe 13. The radial clearance 56 between the delivery auger 10 and the dispensing pipe 13 prevents damage to particulate materials being conveyed in the direction indicated by the arrow A into the dispensing pipe 13 by the delivery auger 10 by eliminating trapping or jamming of the particulate material between the delivery auger 10 and the dispensing pipe 13 at the dispensing outlet 12.

The increased diameter $D^2$ of the delivery auger 10 at the auger extension 33 within the dispensing pipe 13 maximises engagement of the delivery auger extension 33 with particulate materials within the dispensing pipe 13 to maximise effective delivery of the materials in the direction indicated by the arrow A through the dispensing pipe 13 and assists in ensuring that the auger 10 runs true.

A second annular or radial clearance 58 is therefore defined by the delivery auger 10 at the auger extension 33 and the internal face 57 of the dispensing pipe 13. The second radial clearance 58 is therefore smaller than the first radial clearance 56. As the dispensing pipe 13 has a radius $R^3$ the second radial clearance 58 can therefore be defined as:

$R^3 31 R^2$ while the first radial clearance 56 can be defined as:

$R^3 - R^1$ where $D^2$ is greater than $D^1$ and $D^4$ can be equal to, greater than or less than $D^1$.

The provision of an auger 10 having the varying diameters $D^1$, $D^2$ and $D^4$ facilitates uninterrupted transport of with minimum damage to particulate material during transport of the material from the reservoir 9 into and through the dispensing pipe 13.

As indicated previously, the delivery auger 10 is powered by a motor (not shown) in communication with the delivery auger bearing 11 in the rear wall 5. The motor facilitates rotation of the delivery auger 10 about its longitudinal axis 55 in the direction indicated by the arrow B to convey particulate material in the direction indicated by the arrow A into and through the dispensing pipe 13. However, the motor can also be adapted to rotate the delivery auger 10 about its longitudinal axis 55 in the direction indicated by the arrow C in FIG. 9 to facilitate a reverse action of the auger 10 about the longitudinal axis 55 so that particulate material at the dispensing outlet 12 and in the dispensing pipe 13 is returned towards the reservoir 9 in the direction indicated by the arrow D in FIG. 9 by the auger extension 33 and the auger 10.

The increased outer diameter $D^2$ of the auger extension 33 of the delivery auger 10 therefore can urge and return material within the dispensing pipe 13 through the dispensing outlet 12 into the reservoir 9 to clear material from the portion of the dispensing pipe 13 in which the auger extension 33 is located i.e. the dispensing pipe 13 outlet portion.

FIGS. 3 to 8 show an alternative embodiment of a manifold-type ice door 14 and corresponding dispensing pipe 13 and secondary dispensing pipe 20 for use in the dispensing apparatus 1 of FIG. 1. Accordingly, like numerals indicate like parts of the dispensing apparatus of FIG. 1.

FIG. 3 shows a perspective view from above and the storage hopper side of the ice door inner plate 16 of the ice door 14 while FIG. 4 shows an opposite perspective view of the outer plate 17 of the ice door 14. The ice door inner plate 16 is therefore disposed towards the front wall 4 of the storage hopper 2 while the ice door outer plate 17 is disposed away from the front wall 4 of the storage hopper 2. As shown in the drawings, the inner plate 16 and the outer plate 17 are mounted together in a mating relationship as previously described while an internal recessed chamber 50 is defined in the inner plate 16 between the inner plate 16, the outer plate 17 as previously described.

However, in the present embodiment, the recessed chamber 50 is circular in shape to house a quasi-circular ice door plate 49 as shall be explained more fully below.

As shown in FIG. 3 and FIGS. 5 to 8, the dispensing pipe 13 extends through the inner plate 16 and the chamber 50 at the dispensing pipe port 15a and communicates with the secondary dispensing pipe 20 through the outer plate 17 which exits the ice door 14 at the dispensing pipe port 15b.

The chamber 50 is also in communication with a main air delivery pipe 41 which is subdivided into a first air delivery pipe portion 42 and a second air delivery pipe portion 45. The second air delivery pipe portion 45 extends into the chamber 50 at a secondary air inlet 48a in the inner plate 16 which extends through the inner plate 16 into the chamber 50. The secondary air inlet 48a is openable and closeable by the ice door plate 49 in the chamber 50. The secondary air delivery pipe portion 45 then continues through the outer plate 17 and exits the outer plate 17 at a secondary air outlet 48b into a secondary second air delivery pipe 46 which extends downwards substantially perpendicular to the longitudinal axis 55 defined by the delivery auger 10 into the secondary dispensing pipe 20 and which in turn is in communication with the discharge conduit 19. The longitudinal axis of the discharge conduit 19 is disposed in a plane parallel to the longitudinal axis 55 defined by the delivery auger 10 and extends outwards from the outer plate 17. The secondary second air delivery pipe 46 is in communication with the secondary dispensing pipe 20 at an outer air port 40 for delivering air or other conveying medium into the secondary dispensing pipe 20 and in turn the discharge conduit 19. Internally, the secondary second air delivery pipe 46 is provided with a solenoid operated butterfly valve 47 for controlling passage of air through the secondary second air delivery pipe 46 via the outer air port 40 into the secondary dispensing pipe 20 and in turn the discharge conduit 19.

The first portion 42 of the main air delivery pipe 41 is in communication with the chamber 50 of the ice door mounting 14 at a first air inlet 43b defined in the ice door outer plate 17. The first air inlet 43 (in an analogous fashion to the secondary air inlet 48) is openable and closeable by the ice door plate 49 in the chamber 50. The first portion 42 of the main air delivery pipe 41 extends through the chamber 50 of the ice door 14 to communicate with an inner air delivery pipe 44 mounted on the outer surface of the inner plate 16 at a first air outlet 43a. The inner air delivery pipe 44 is substantially arcuate in shape and extends between the first air outlet 43a and the dispensing pipe 13 to effect communication between the first air inlet 43 and the dispensing pipe 13. More particularly, the inner air delivery pipe 44 is in communication with the dispensing pipe 13 at an inner air port 39 disposed adjacent the dispensing pipe port 15a.

The air delivery pipe 44 may be provided with a permanently openable or an openable and closable orifice or vent 68 to effect controlled air movement through the delivery pipe 44 so that ice may be conveyed by the conveying medium applied through the delivery pipe 44 under reduced pressure i.e. at a level appropriate for loading a batch of incremental ice.

As shown in FIGS. 3 to 8, the inner air port 39 is located on the dispensing pipe 13 between the ice door inner plate 16 adjacent to but upstream of the auger free end 38 of the delivery auger 10. Conversely, the outer air port 40 is disposed downstream but adjacent to the ice door plate 49 so that the inner air port 39 and the outer air port 40 are both in communication with the dispensing pipe 13 and the secondary dispensing pipe 20 either side of the ice door plate 49.

Internally, the ice door 14 is provided with the controllable ice door plate 49 similar in a number of respects to the pivotable plate 34 described in FIG. 2. The ice door plate 49 is moveable by a motor 18 between an "open" position to facilitate passage of conveying medium through the air inlet 43b in the outer plate 17 and particulate material through the dispensing pipe 13 into the dispensing pipe 20 via the dispensing pipe ports 15a and 15b, a "closed" position to obstruct the dispensing pipe 13 by blocking the dispensing pipe port 15a to prevent movement of conveying medium and particulate material through the dispensing pipe 13 to the reservoir 9 but which allows conveying medium through the second air inlet 48a and an intermediate position to facilitate a "backflush" operation in which the first air inlet 43b is closed by the plate 49 and conveying medium passed into the dispensing pipe 13 via the chamber 50 from the second air inlet 48a to clear the dispensing pipe 13 adjacent the ice door plate 49 and in which the dispensing pipe port 15a of the dispensing pipe 13 is kept open to facilitate the "backflush" operation.

The operation and use of the ice door plate 49 will be more clearly understood having regard to FIGS. 3 to 8. As shown in the drawings, the ice door plate 49 is plate like in construction and functions as a control means for controlling passage of conveying medium such as air from the main air delivery pipe 41 via the first air delivery pipe portion 42 and second air delivery pipe portion 45 into the first air inlet 43b and the second air inlet 48a respectively which in turn communicate with the inner air port 39 and outer air port 40 respectively as previously described.

The ice door plate 49 is substantially semi-circular in shape. More particularly, the ice door plate 49 has a substantially circular or curved outer edge 59 and an elliptical or quasi-S shaped inner edge 60 to define a notch 61 in the inner edge 60.

The ice door plate 49 is mounted on a pivot shaft 62 disposed between the inner plate 16 and the outer plate 17 at a pivot mounting 63. The ice door plate 49 is therefore pivotable about the axis of the pivot shaft 62 at the pivot mounting 63. As shown in FIGS. 3 to 8, the pivot shaft 62 and the ice door plate 49 are located between the inner plate 16 and outer plate 17 so that the ice door plate 49 can cause selective opening and closing of the first air inlet 43b, the second air inlet 48a and the dispensing pipe port 15a upon rotation of the ice door plate 49 about the axis of the shaft 62. More particularly, as shown in the drawings, the first air inlet 43b and the second air inlet 48a are located within a notional circle 64 defined about the centre point of the pivot shaft 62 and having its outer edge at the outer edge 59 of the plate 49.

Similarly, the dispensing pipe port 15a is located within the notional circle 64 so that the ice door plate 49 is pivotable about the axis of the pivot shaft 62, to control movement of particulate material to and from the storage hopper 2 through the dispensing pipe 13 the dispensing pipe ports 15a and 15b, and the secondary dispensing pipe 20.

As shown in the drawings, the first air inlet 43b, the second air inlet 48a and the dispensing pipe port 15a are spaced about the axis of the pivot shaft 62 at intervals. Accordingly, rotational movement of the ice plate 49 at intervals about the pivot shaft 62 causes opening and closing of the first air inlet 43b, the second air inlet 48a and the dispensing pipe port 15a explained as above and more fully below.

Use of the invention is herein described having regard to exploitation of the invention for the purposes of dispensing ice cubes. However, it will be appreciated by those skilled in the art that the dispensing apparatus 1, the storage hopper 2 and the delivery auger 10 may be employed separately or in combination in the dispensing of any particulate material as hereinbefore defined.

In use, in the embodiment shown in FIGS. 1, 2 and 9, the dispensing apparatus 1 in accordance with the invention is mounted or located beneath an ice maker so that ice cubes 65 from the ice maker drop by gravity into the storage hopper 2 which as will be appreciated by those skilled in the art is usually surrounded by an insulating material.

Where it is desired to form an incremental batch of ice cubes 65 within the coiled discharge conduit 19, the delivery auger 10 is actuated to rotate in the direction indicated by the arrow B in FIG. 9 to convey ice cubes 65 through the dispensing outlet 12 into the dispensing pipe 13 in the direction indicated by the arrow A. It should be noted that ice cubes 65 accumulated within the reservoir 9 of the dispensing apparatus 1 are prevented from fusing or aggregating to form lumps within the reservoir 9 by intermittent or occasional rotation of the agitator 23 within the reservoir 9 prior to or during delivery as previously described.

The ice cubes 65 are urged by the action of the auger 10 through the ice door 14 by operating the ice door motor 18 to move the pivotable plate 34 from the closed position shown in broken lines in FIG. 2 over the dispensing pipe 13 to the open position shown in FIG. 2 to facilitate transport of the ice cubes 65 through the ice door 14 into the secondary dispensing pipe 20.

The ice cubes 65 then descend downwards through the downwardly extending portion 52 of the coiled discharge conduit 19. The ice cubes 65 emerging from the ice door 14 into the secondary dispensing pipe 20 are urged and/or carried by a conveying medium, typically pressurised air, passed into the coiled discharge conduit 19 by a blower 51 or the like through the air entry end 21 of the coiled discharge conduit 19. The conveying medium is urged into the coiled discharge conduit 19 by the blower or pressurising means 51 adapted to urge the conveying medium into the coiled discharge conduit 19 at a constant reduced or lowered pressure to urge the ice cubes 65 into the coiled discharge conduit 19. Accordingly, as the auger 10 is rotated and ice cubes 65 are delivered through the ice door 14 into the coiled discharge conduit 19 a large batch of ice 65 is formed within the coiled discharge conduit 19.

It is not necessary for conveying medium to be continuously urged through the apparatus of the invention by the blower 51 or the like. For example, material to be dispensed may be urged through the dispensing pipes 13 and 20 into the discharge conduit 19 by the delivery auger 10 and the delivery auger extension 33. The material therefore accumulates, for example, in the downwardly extending portion 52 and/or in the coil of the coiled discharge conduit 19. Accordingly, a mini-batch can accumulate within the vertically disposed portion 52 of the discharge conduit 19 or in the upstream end of the discharge conduit 19. Following accumulation of a mini-batch, air from the blower 51 can be introduced through the vertically disposed portion 52 as previously described to urge the mini-batch through the discharge conduit 19. The process is then repeated until another mini-batch is accumulated whereupon the air is then re-introduced by way of a valving system (not shown).

Each accumulated mini-batch to be urged through the discharge conduit 19 therefore abuts the preceding mini-batch to form an ever-increasing incremental batch which is in turn urged through the discharge conduit by the conveying medium from the blower 51 and the impact of subsequent mini-batches so that a space is created or vacated within the dispensing pipe 20, the vertically disposed portion 52 or the discharge conduit 19 proper to receive a subsequent mini-batch. Accordingly, through intermittent introduction of air and the use of mini-batches to form the incremental batch, followed by movement of a mini-batch, a space is created so that ice cubes and the like do not accumulate at the ice door 49 thereby avoiding obstruction of the ice door 49.

In order to effect discharge of the large batch of ice cubes 65 within the coiled discharge conduit 19 conveying medium is urged by the pressurising or blowing means through the air entry end 21 of the coiled discharge conduit 19 to effect discharge of the incremental batch of ice cubes stored within the coiled discharge conduit 19 from the conduit discharge end 22.

Following loading of a batch of ice of the desired size into the coiled discharge conduit 19, the delivery auger 10 and accordingly the auger extension 33 is reverse rotated in the direction indicated by the arrow C in FIG. 9. Simultaneously, conveying medium is urged by the pressurising means or blower through the air entry end 21 of the coiled discharge conduit 19 to effect backflow or backflush of ice cubes 65 located within the secondary dispensing pipe 20, the dispensing pipe 13 and the dispensing pipe port 15 to effect clearance of ice cubes from the dispensing pipe port 15 to facilitate closure of the pivotable plate 34 as previously described. Following the reverse action of the delivery auger 10 to clear ice cubes from the dispensing pipe port 15, the pivotable plate 34 is moved from the open position shown in FIG. 2 to the closed position shown in broken lines also shown in FIG. 2.

In order to discharge the batch of ice contained within the coiled discharge conduit 19, conveying medium such as air is continued to be applied at full pressure through the air entry end 21 of the coiled discharge conduit to effect discharge of the batch of ice from the conduit discharge end 22.

In an alternate form of use of the dispensing apparatus of the invention, the ice door 14 of FIGS. 3 to 8 is substituted for the ice door 14 of FIGS. 1 and 2. Accordingly, the storage hopper 2, the agitator 23 and the delivery auger 10 function in a substantially analogous manner to the storage hopper 2, delivery auger 10 and agitator 23 of FIG. 1. However, the ice door 14 facilitates alternative effective formation and delivery of large ice batches into and from the discharge conduit 19. The discharge conduit 19 may be coiled as shown in FIG. 1 or otherwise attached to the end of the secondary discharge pipe 20 and extend horizontally therefrom or up or down. In addition, the discharge conduit 19 can be shaped to be provided with or without corners as required to convey material within the discharge conduit 19 to a desired location. More particularly, in order to form or load a batch of ice 65 in the discharge conduit 19 from the reservoir 9 of the storage hopper 2 the ice door plate 49 is rotated with the pivot shaft 62 as shown in FIG. 4(a) so that the second air inlet 48a is closed while the first air inlet 43b and the dispensing pipe port 15a is open to facilitate passage of ice cubes 65 through the dispensing pipe 13 into the secondary dispensing pipe 20 assisted by air via the port 39.

As shown in FIGS. 5(b), 6, 7(b) and 8(b), the dispensing pipe 13 and the delivery auger extension 33 are of sufficient length to inhibit reflux of ice particles within the dispensing pipe 3 through the dispensing pipe 13 into the reservoir 9. Accordingly, a significant distance is defined between the ice plate 49 and the reservoir 9 so that the delivery extension 33 in cooperation with the dispensing pipe 13 and the ice particles themselves within the pipe 13 prevents reflux.

It should be noted that the position of the ice door plate 49 is typically controlled by means of cam-operated microswitches (not shown) communicable with the motor 18 by a micro processor.

Figure 5A:
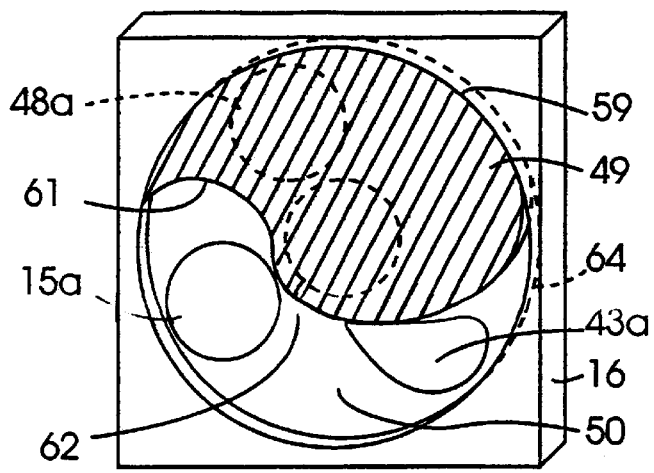
FIG. 5(a) is a schematic front elevation of the pivotable internal ice door plate of the ice door of FIGS. 3 and 4 in the large batch-loading position.
Figure 5B:
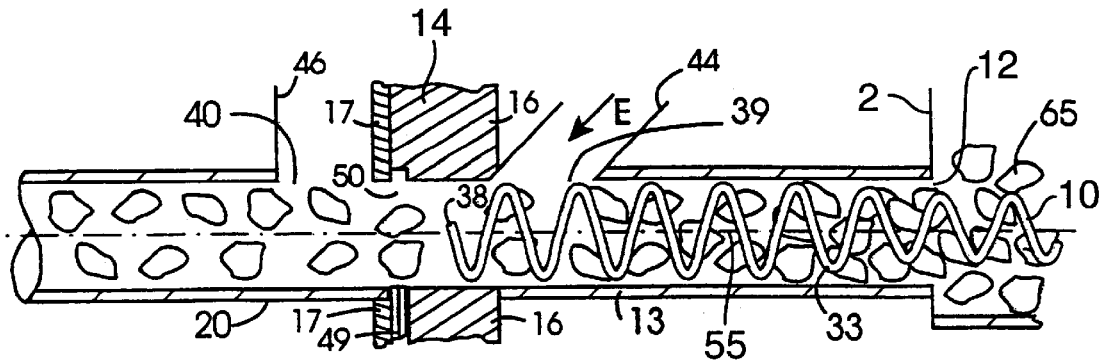
FIG. 5(b) is a side elevation in partial cross-section of a portion of the dispensing pipe, the inner air port and outer air port at the ice door with the ice door plate in the position shown in FIG. 5(a) with the direction of movement of the air in the inner port indicated by the arrow E.
Figure 6:
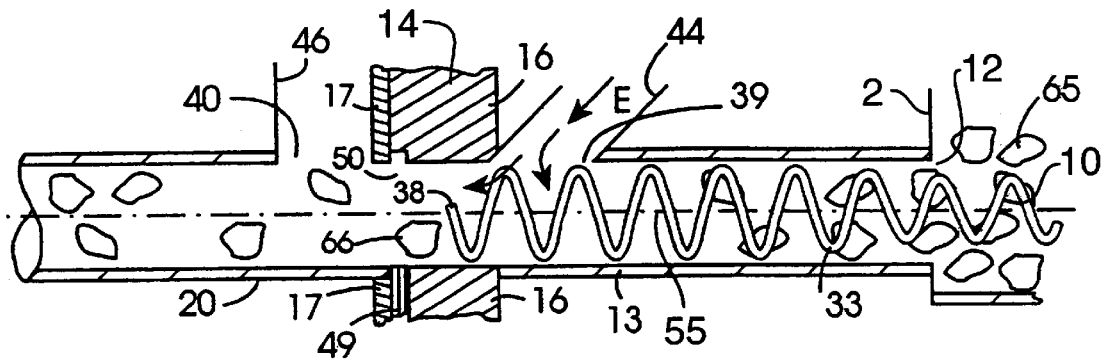
FIG. 6 is a side elevation in partial cross-section of a portion of the dispensing pipe of FIG. 5(b) with a rogue ice-cube disposed adjacent the free end of the delivery auger.

Conveying medium, typically air, from a pressurised air source or blower (not shown) is conveyed through the main air delivery pipe 41, the first portion 42 of the main air delivery pipe, through the first air inlet 43b, through the inner air delivery pipe 44, via the inner air port 39 into the dispensing pipe 13 as shown in FIG. 5(b) in the direction indicated by the arrow E to urge ice cubes 65 through the dispensing pipe 13 and the secondary dispensing pipe 20. Simultaneously, the delivery auger 10 and accordingly the auger extension 33 is actuated to rotate in the direction indicated by the arrow B in FIG. 9 to urge the ice cubes 65 through the dispensing pipe 13 and in turn through the secondary dispensing pipe 20.

Accordingly, the ice plate 49 is positioned so that the dispensing pipe port 15a and the first air inlet 43b are both open while the second air inlet 48a is closed.

Once the full incremental batch has been loaded into the discharge conduit 19, the delivery auger 10 is stopped. However, flow of pressurised air is maintained through the inner air port 39 to effect clearance of rogue ice cubes 65 from within the dispensing pipe 13 and in particular adjacent the free end 38 of the delivery auger 10. Accordingly, the plate 49 is maintained in the same position as shown in FIG. 5(a) to effect the clearance in the dispensing pipe 13 shown in FIG. 6.

In order to remove any rogue cubes 66 remaining within the dispensing pipe 13 or the secondary dispensing pipe 20 in the region of the ice door plate 49 or the dispensing pipe port 15 the ice door plate 49 is, after a preprogrammed delay, then rotated with the shaft 62 under the control of the micro processor (not shown) to close the first air inlet 43b and open the second air inlet 48a whilst maintaining the dispensing pipe port 15a in the open position.

Figure 7A:
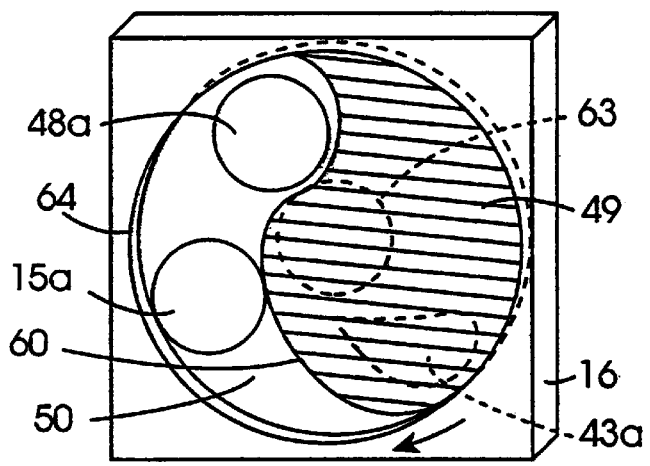
FIG. 7(a) is a schematic front elevation of the pivotable internal ice door plate of FIG. 5(a) in the backflush position.

It should be noted that the notch 61 of the ice door plate 49 facilitates the opening of the combination of the dispensing pipe port 15a and the first air inlet 43b as shown in FIG. 5(a) and the opening of the second air inlet 48 and the dispensing pipe port 15a as shown in FIG. 7(a).

Figure 7B:
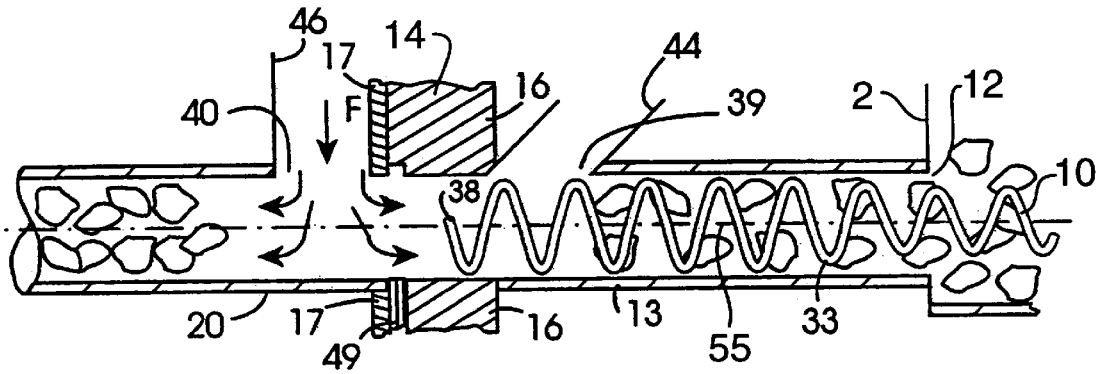
FIG. 7(b) is a side elevation in partial cross-section of a portion of the dispensing pipe of FIG. 5(a) with the pivotable ice door plate in the backflush position of FIG. 7(a) and with air entering the dispensing pipe in the direction indicated by the arrow F through the outer air port.

The "backflush" is effected through the dispensing pipe 13 by urging pressurised air from the blower in the direction indicated by the arrow F in FIG. 7(b) from the main air delivery pipe 41, through the second portion 45 of the main air delivery pipe 41, through the second air inlet 48a, into the second secondary air delivery pipe 46 and finally into the secondary dispensing pipe 20 and the dispensing pipe 13 via the outer air port 40. Accordingly, the pressurised air causes any rogue cube 66 to be urged or backflushed upstream towards the reservoir 9 along the dispensing pipe 13 to effect clearance of the secondary dispensing pipe 20 and the dispensing pipe 13 adjacent the ice door plate 49. During the "backflush" operation the delivery auger 10 may be reversed to assist in the removal of rogue cubes.

Figure 8A:
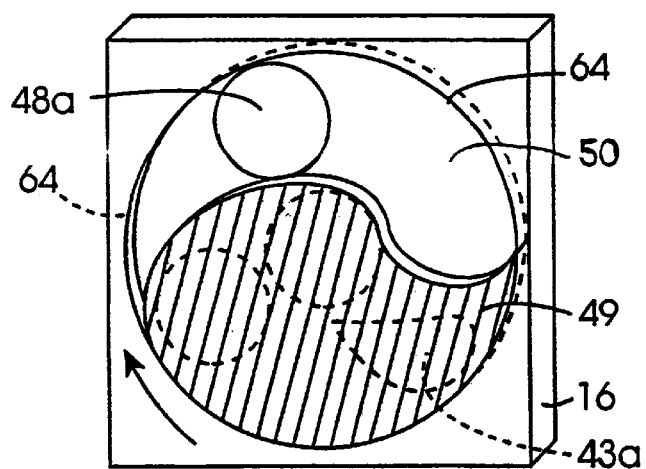
FIG. 8(a) is a schematic front elevation of the pivotable internal ice door plate in the large batch discharge or blowing position.

Finally, the micro-processor then causes the ice plate 49 to rotate further to close the dispensing pipe port 15a and to maintain the second air inlet 48a open to facilitate passage of air under pressure from the air inlet 41 into the secondary dispensing pipe 20 in the direction indicated by the arrow G outer air port 40 as described in relation to FIGS. 7 and 8 in sequence to effect clearance, if necessary backflush, and subsequent discharge of a large batch of ice from the coiled discharge conduit 19.

Accordingly, following the above mentioned method of the invention in which the ice door of FIGS. 3 to 8 is substituted for the ice door 14 of FIGS. 1 and 2, material to be dispensed can therefore accumulate, for example, in the downwardly extending portion 52 and/or in the coil of the coiled discharge conduit 19 as previously described. Therefore, a mini-batch can accumulate within the vertically disposed portion 52 of the discharge conduit 19 or in the upstream end of the discharge conduit 19. Following accumulation of a mini-batch, air from the blower 51 can then be introduced through the vertically disposed portion 52 to urge the mini-batch through the discharge conduit 19.

Where the discharge conduit 19 extends horizontally from the discharge pipe 20 or up or down therefrom, the conveying medium is urged into the discharge conduit by the blower 51 at a constant introduced or lowered pressure as previously described to urge the ice cubes 65 into the discharge conduit 19. Accordingly, rotation of the auger 10, causes ice cubes 65 to be delivered through the ice door 14 into the discharge conduit 19 to form a large or incremental batch of ice 65 within the discharge conduit 19.

In use, the relative outer diameters $D^1$, $D^2$ and $D^4$ and radii $R^1$, $R^2$, $R^4$ of the delivery auger 10 and auger extension 33 and the internal diameter $D^3$ and radius $R^3$ of the dispensing pipe 13 facilitates effective conveying of ice cubes 65 through the dispensing pipe 13 as previously described and also minimises jamming of the delivery auger 10 at the dispensing pipe port 15 and damage to ice cubes 65.

The following table summarises the method of use of the dispensing apparatus, having the ice door 14 of FIGS. 3 to 8;

| STEP NO. | ICE DOOR PLATE POSITION NO. | DESCRIPTION | ICE DOOR PLATE | FIRST AIR INLET 43 | SECOND AIR INLET 48 | AIR BLOWER/ CONVEYING MEDIUM SOURCE |
|---|---|---|---|---|---|---|
| 1 | 1 | Loading batch Delivery auger 10 rotated. | Open | Open | Closed | On |
| 2 | 1 | Delivery auger 10 stopped. | Open | Open | Closed | On |
| 3 | 2 | Backflush to effect clearance of rogue ice cubes 66. | Open | Closed | Open | On |
| 4 | 3 | Effecting discharge of incremental batch from discharge conduit 19. | Closed | Closed | Open | On |

Figure 8B:
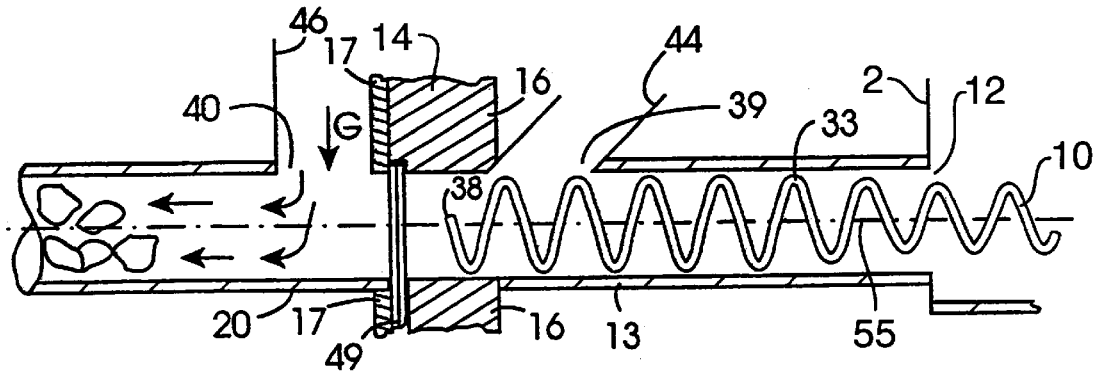
FIG. 8(b) is aside elevation in partial cross-section of a portion of the dispensing pipe of FIG. 5(a) with the pivotable ice door plate in the large batch discharge or blowing position of FIG. 8(a) with the direction of movement of air through the outer port being indicated by the arrow G.

NOTES:
1. The auger 10 may be reversed during step no. 3.
2. The butterfly valve 47 could be closed between step nos. 3 and 4 (see below).

in FIG. 8(b) to effect discharge of the large batch of ice accumulated within the discharge conduit 19.

As will be appreciated by those skilled in the art, the operation described in relation to FIGS. 5(a) and 5(b) is continued until such time as a batch of the desired size has accumulated within the coiled discharge conduit 19. Following accumulation of a large batch of the desired size, the operation described above in relation to FIG. 6 is performed, then the ice door 49 is rotated in the sequence described in FIGS. 7 and 8 while pressurised air is passed through the Passage of the pressurised air through the second secondary air delivery pipe 46 can be restricted by causing the micro processor to briefly close a butterfly valve 47 disposed within the second secondary air delivery pipe 46. This brief closure facilitates a pressure build up and to achieve more effective conveying and discharge of material.

In the above mentioned sequence, conveying medium applied through the second air inlet 48a is exploited to effect backflush where the ice plate 49 opens port 15a. However, following closure of port 15a with the ice plate 49, conveying medium applied through the second air inlet 48a is automatically applied for the evacuation of the incremental batch from the discharge conduit 19 and delivery to a desired location such as a drinks dispenser or the like.

While the conveying medium has been described as being air, any other suitable conveying medium may be used. While an air blower has been described where providing the conveying air, any other suitable conveying air or medium source may be used. In addition, the conveying medium or air may be held in a receiver which would be fed by a compressor or an air blower or the like. The conveying air may be supplied at any desired pressure. For example, where particulate material such as ice is being dispensed from the storage hopper 2, through the dispensing pipe 13 into the discharge conduit 19 a lower air pressure would be acceptable while when a large batch of particulate material is being discharged from the discharge conduit 19 a higher pressure would be required.

Alternatively, particularly in relation to the embodiment described in FIGS. 1 and 2, a vacuum generator can be used instead of a blower as will be appreciated by those skilled in the art. The vacuum generator would be in communication with the discharge conduit 19 at the discharge end 22 of the discharge conduit 19.

It is believed that a discharge conduit of circular cross-section is preferable to other cross sections and where a conveying conduit of circular cross section is used it is recommended that the diameter of the internal cross section of the conduit should be at least 10% greater than the maximum dimension of a particle of particulate material such as an ice cube.

In a preferred embodiment of the invention, the discharge conduit 19 has a diameter of approximately 2 inches while an incremental or large batch has a weight of approximately 3–6 pounds and when formed from smaller batches each small batch having a weight in the size range of ½ pound to 1 pound.

The pressure of the pressurised conveying medium typically can be up to 10 PSI but is typically in the range 1.5 PSI to 3 PSI for smaller systems according to the length and dimensions and relative orientations of the discharge conduit 19.

In addition, the butterfly valve 47 for controlling passage of conveying medium through the second air delivery pipe 46 via the outer air port 40 into the secondary dispensing pipe 20 is typically maintained in the closed position for between 0.2 and 10 seconds, and preferably for between 1.5 to 3 seconds to effect a sufficient build up of pressure of the conveying medium before entry of the conveying medium into the discharge conduit 19.

Where conveying conduits of cross sections other than the circular cross section are employed, it is believed that the minimum transverse dimension of the conveying conduit should be at least 10% greater than the maximum dimension of the particle being conveyed.

The invention is not limited to the embodiments hereinbefore described which may be varied in construction and detail.

We claim:

1. Dispensing apparatus for dispensing particulate material from an upstream source to a discharge conduit, the apparatus comprising a storage hopper having a dispensing outlet through which the particulate material is delivered to the discharge conduit, a conveying means communicable with the discharge conduit for conveying the particulate material through the discharge conduit, a dispensing pipe having a circular inner and outer transverse cross-sectional area extending from the storage hopper and communicating the discharge conduit with the storage hopper through the dispensing outlet, the dispensing pipe having a dispensing bore for accommodating the particulate material from the hopper to the discharge conduit, a delivery auger located in the storage hopper for delivering the particulate material to the dispensing outlet, and an auger extension contiguous with the delivery auger and extending co-axially therefrom, the auger extension extending through the dispensing outlet into the dispensing bore of the dispensing pipe and being co-axial therewith for delivering the particulate material through the dispensing pipe, the diameter of the auger extension being greater than the diameter of the delivery auger adjacent the dispensing outlet, and the auger extension and the delivery auger cooperating with the conveying means which forms discrete batches of particulate material in the discharge conduit for conveying therethrough by the conveying means.

2. Dispensing apparatus as claimed in claim 1 in which the dispensing apparatus is adapted for dispensing ice lumps.

3. Dispensing apparatus as claimed in claim 1 in which the auger extension is reversibly rotatable in the dispensing bore of the dispensing pipe for clearing the dispensing pipe of particulate material.

4. Dispensing apparatus as claimed in claim 1 in which the dispensing pipe comprises an upstream dispensing inlet portion extending from the dispensing outlet, and a downstream dispensing outlet portion communicating with the discharge conduit, the dispensing bore extending continuously through the dispensing inlet portion and the dispensing outlet portion.

5. Dispensing apparatus as claimed in claim 4 in which the auger extension extends through the inlet portion and the outlet portion of the dispensing pipe.

6. Dispensing apparatus as claimed in claim 1 in which the conveying means comprises a conveying medium source, and the conveying means is communicable with the discharge conduit for delivering the conveying medium from the conveying medium source to the discharge conduit.

7. Dispensing apparatus as claimed in claim 6 in which a back pressure generating means is provided for causing a back pressure accumulation in the discharge conduit for facilitating discharge of the discrete batches of particulate material through the discharge conduit.

8. Dispensing apparatus as claimed in claim 6 in which the conveying means is a pressurized conveying medium.

9. Dispensing apparatus as claimed in claim 8 in which the conveying medium is conveying air.

10. Dispensing apparatus as claimed in claim 6 in which a control means is provided for controlling delivery of the conveying medium from the conveying medium source and for controlling delivery of the particulate material through the dispensing pipe.

11. Dispensing apparatus as claimed in claim 10 in which the control means is located in the dispensing pipe.

12. Dispensing apparatus as claimed in claim 11 in which the control means comprises a closure plate moveable between a first position in which the dispensing pipe is blocked and a second position in which the dispensing pipe is unblocked.

13. Dispensing apparatus as claimed in claim 11 in which an upstream conveying medium inlet is located in the dispensing pipe upstream of the control means for receiving conveying medium from the conveying medium source into the dispensing pipe for delivery to the discharge conduit.

14. Dispensing apparatus as claimed in claim 11 in which a downstream conveying medium inlet is located in the dispensing pipe downstream of the control means for receiving conveying medium from the conveying medium source for delivery to the discharge conduit.

15. Dispensing apparatus as claimed in claim 1 in which an agitator is located within the storage hopper for agitating the particulate material therein.

16. Dispensing apparatus as claimed in claim 15 in which the agitator comprises an elongated shaft defining a longitudinal axis, the agitator shaft being rotatably mounted in the storage hopper.

17. Dispensing apparatus as claimed in claim 16 in which the agitator shaft is intermittently and incrementally rotatable about its longitudinal axis through an angle up to 360° at predetermined time intervals for intermittently agitating the particulate material in the storage hopper.

18. Dispensing apparatus as claimed in claim 16 in which the agitator shaft is intermittently and incrementally rotatable about its longitudinal axis through an angle up to 360° at randomly selected time intervals for intermittently agitating the particulate material in the storage hopper.

19. Dispensing apparatus as claimed in claim 16 in which the agitator shaft is intermittently and incrementally rotatable about its longitudinal axis through an angle in the range of 30° to 120° at predetermined time intervals for intermittently agitating the particulate material in the storage hopper.

20. Dispensing apparatus as claimed in claim 16 in which the agitator shaft is intermittently and incrementally rotatable about its longitudinal axis through an angle in the range of 30° to 120° at randomly selected time intervals for intermittently agitating the particulate material in the storage hopper.

21. Dispensing apparatus as claimed in claim 16 in which the agitator shaft is rotatable about its longitudinal axis during delivery of particulate material from the storage hopper to the discharge conduit.

22. Dispensing apparatus as claimed in claim 16 in which a secondary agitating means extends from the agitator shaft.

23. Dispensing apparatus as claimed in claim 22 in which the secondary agitating means comprises a spike extending transversely from the agitator shaft relative to the longitudinal axis of the agitator shaft.

24. Dispensing apparatus as claimed in claim 22 in which the secondary agitating means comprises a T-bar having an elongated radial member extending transversely from the agitator shaft relative to the longitudinal axis of the shaft, the radial member terminating in a cross member for forming the T-bar.

* * * * *